(12) United States Patent
Blea et al.

(10) Patent No.: US 7,917,711 B2
(45) Date of Patent: Mar. 29, 2011

(54) SYSTEM, APPARATUS, AND METHOD FOR AUTOMATIC COPY FUNCTION SELECTION

(75) Inventors: David Randall Blea, Tucson, AZ (US); Mary Catherine Burton, Tucson, AZ (US); Gregory Edward McBride, Tucson, AZ (US); David Michael Shackelford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1215 days.

(21) Appl. No.: 10/713,634

(22) Filed: Nov. 14, 2003

(65) Prior Publication Data

US 2005/0108565 A1    May 19, 2005

(51) Int. Cl.
G06F 12/00 (2006.01)
G06F 13/00 (2006.01)
G06F 13/28 (2006.01)
G06F 7/00 (2006.01)
G06F 17/00 (2006.01)

(52) U.S. Cl. ........ 711/162; 711/161; 707/640; 707/644; 707/654; 707/655

(58) Field of Classification Search ............. 711/161, 711/162
See application file for complete search history.

(56) References Cited

U.S. PATENT DOCUMENTS

| | | | |
|---|---|---|---|
| 5,018,060 A | 5/1991 | Gelb et al. | 364/200 |
| 5,287,500 A * | 2/1994 | Stoppani, Jr. | 711/211 |
| 5,454,099 A | 9/1995 | Myers et al. | 395/575 |
| 6,215,953 B1 | 4/2001 | Shin | 386/94 |
| 6,286,085 B1 * | 9/2001 | Jouenne et al. | 711/162 |
| 6,330,621 B1 * | 12/2001 | Bakke et al. | 710/5 |
| 6,418,450 B2 | 7/2002 | Daudemarde | 707/200 |
| 6,467,034 B1 | 10/2002 | Yanaka | 711/162 |
| 7,269,612 B2 | 9/2007 | Devarakonda et al. | |
| 7,725,444 B2 | 5/2010 | Devarakonda et al. | |
| 7,730,042 B2 | 6/2010 | Devarakonda et al. | |
| 2001/0034812 A1 * | 10/2001 | Ignatius et al. | 711/112 |

(Continued)

FOREIGN PATENT DOCUMENTS

JP    60-048541    3/1985

(Continued)

OTHER PUBLICATIONS

M. Blunden et al., Implementing ESS Copy Services on S/390, IBM Redbooks, Dec. 2000, pp. 1-9, and pp. 265-266.

(Continued)

Primary Examiner — Yaima Campos
(74) Attorney, Agent, or Firm — Kunzler Needham Massey & Thorpe (57) ABSTRACT

The invention automatically selects a copy function according to a policy associated with data to be copied. The apparatus comprises an identification module configured to identify available copy functions in response to a data copy request that includes a predefined copy policy, a comparison module configured to compare each copy function of a storage device to attributes of the predefined copy policy, a selection module configured to automatically select a copy function that satisfies the predefined copy policy, and a relationship module configured to establish a copy relationship between the determined copy function and the data copy request. A policy generation module may be included and configured to read a set of required attributes from an application and to establish the predefined copy policy based on the set of required attributes from the application.

30 Claims, 8 Drawing Sheets

U.S. PATENT DOCUMENTS

| | | | |
|---|---|---|---|
| 2002/0129049 A1 | 9/2002 | Collins et al. | 707/500 |
| 2002/0143999 A1* | 10/2002 | Yamagami | 709/249 |
| 2002/0188592 A1* | 12/2002 | Leonhardt et al. | 707/1 |
| 2003/0033308 A1 | 2/2003 | Patel et al. | 707/10 |
| 2003/0140204 A1* | 7/2003 | Ashton et al. | 711/162 |

FOREIGN PATENT DOCUMENTS

| | | |
|---|---|---|
| JP | 05-210562 | 8/1993 |
| JP | 06-210562 | 8/1994 |
| JP | 11-338647 | 12/1999 |
| JP | 2000-276304 | 10/2000 |
| JP | 2002-140239 | 5/2002 |
| JP | 2002-324000 | 11/2002 |
| JP | 2003-048707 | 2/2003 |
| TW | 454120 | 9/2001 |
| TW | 509915 | 11/2002 |

OTHER PUBLICATIONS

"Leveraging New Storage Technology for A Competitive Advantage", IBM Global Services, Sep. 2001, pp. 1-13.

JPO Office Action, TUC920030093JP1, Jun. 22, 2010.

* cited by examiner

| Attribute | Copy Policy | Copy Function 1 | Score | Copy Function 2 | Score | Copy Function 3 | Score |
|---|---|---|---|---|---|---|---|
| Recovery Point Objective (RPO) | Less Than 30 Minutes | Less Than 20 Minutes | 1 | Zero Data Loss | 1 | 1 Day | 0 |
| Recovery Time Objective (RTO) | Less Than 30 Minutes | Less Than 1 Hour | 0 | Less Than 20 Minutes | 1 | Less Than 2 Hours | 0 |
| Location | Greater Than 500 Miles | Less Than 1000 Miles | 1 | Less Than 2000 Miles | 1 | At Primary Site | 0 |
| Consistency | Yes | Yes | 1 | Yes | 1 | Yes | 1 |
| Application Impact | Less Than 2 mS | Less Than 2 mS | 1 | Less Than 2 mS Plus Distance Factor | 1 | Less Than 2 Hours | 0 |
| Score Required / Totals | 4 | | 4 | | 5 | | 1 |

FIG. 11

SYSTEM, APPARATUS, AND METHOD FOR AUTOMATIC COPY FUNCTION SELECTION

BACKGROUND OF THE INVENTION

1. Field of the Invention

This invention relates to copying computer data and more particularly relates to the automatic selection of a copy function for use in copying data from an application storage device to a secondary storage device.

2. Description of the Related Art

As financial, scientific, medical, and other critical data are being integrated with computers and computer networks, reliability and availability of the data is increasingly important. Early computer systems relied on backup copies of data on media such as tape storage. Creating backup copies was time consuming and created downtime in applications. Recovery from system failures made computer systems unavailable for long periods of time. Backup media also tended to be unreliable, so data loss was common.

Natural disasters such as fire, lightning, and hurricanes and man made disasters such as civil unrest, computer hacker attacks, and terrorist attacks can also affect computer networks and increase the need for data to be stored remotely. Remote storage at distances from a few miles to thousands of miles is often required to overcome most disaster scenarios.

The need to reduce data loss, application down time, and data recovery has driven the computer industry to develop more reliable backup systems and data transmission methods. These methods vary from traditional tape backup systems to storage area networks that have the ability to continuously back up data as it is being written by an application. Back up locations range from the site where the application resides to thousands of miles away. Storage systems have evolved to be double redundant, triple redundant, or even more to ensure that any data loss is not permanent.

Storage systems have increased in speed for storage devices as well as data transmission methods. Data channels such as optical fiber have greatly increased speed, distance, and quantity of data transmitted. Storage systems have developed into storage area networks, network accessed storage, internet accessed storage, and storage service providers. Computer system architectures have changed and may include local area networks, wide area networks, internet accessed networks, storage area networks, and an infinite number of combinations of various networks.

Every day a greater number of companies become reliant on highly evolved computer systems spread over greater distances. Companies continue to require data systems that are available continuously, highly reliable, and are safe from any form of disaster. Creating increasingly complex, reliable, user-friendly systems puts a great strain on company budgets and information technology (IT) resources. IT personnel must be knowledgeable in an ever-increasing number of specialized systems. Creation of reliable data backup systems is no exception.

Once a computer network that includes one or more applications, storage for the application data, and a means to back up the data from the application is established, IT personnel must choose from several copy functions for use in copying data from application storage devices to secondary storage devices. Each copy function has unique characteristics that must be thoroughly understood in order for the person setting up the system to choose the best copy function for the application.

Once a copy function is chosen, the copy function must be manually configured in the computer system. Knowledge of all the attributes needed for the copy function set-up is essential.

Once a copy function is configured, if system needs change such that another copy function would be more efficient, IT personnel must recognize the system change, manually choose another copy function, and manually change all of the copy function parameter attributes. Manual selection of a copy function requires specialized knowledge, IT personnel time, and company resources. Unless system needs are continually monitored, the computer system may be using an inefficient copy function.

What is needed is a method, apparatus, and system that automatically select a copy function. Beneficially, such a method, apparatus, and system would reduce costs by reducing time spent by IT personnel to constantly monitor and manually change copy functions. Under such a method, apparatus, and system, IT personnel would no longer have to spend time being trained on each available copy function and associated parameter attributes. Since selection of a copy function would be automatic, a new copy function would be selected quickly and the computer system would run more efficiently.

BRIEF SUMMARY OF THE INVENTION

The present invention has been developed in response to the present state of the art, and in particular, in response to the problems and needs in the art that have not yet been fully solved by currently available computer data copy functions. Accordingly, the present invention has been developed to provide a method, apparatus, and system for automatically selecting a copy function for use in copying data from one location to another that overcomes many or all of the above-discussed shortcomings in the art.

The apparatus for automatic copy function selection is provided with a logic unit containing a plurality of modules configured to functionally execute the necessary steps of determining available copy functions and then selecting a copy function that best complies with an application copy policy. These modules in the described embodiments include an identification module configured to identify available copy functions in response to a data copy request, a comparison module configured to compare each copy function of a storage device to attributes of a predefined copy policy, a selection module configured to automatically select a copy function that satisfies the predefined copy policy, and a relationship module configured to establish a copy relationship between the determined copy function and the data copy request.

In one embodiment, the apparatus is further configured to include a policy generation module configured to read a set of required attributes from an application and to establish the predefined copy policy based on the set of required attributes from the application. In another embodiment, the apparatus is further configured to include a policy generation module configured to allow a user to determine the predefined copy policy based on a set of required attributes from an application. In yet another embodiment, the identification module is further configured to determine a set of copy functions compatible with an application, determine a set of copy functions compatible with a source storage device and a destination storage device, and determine the available copy functions that are common to both the set of copy functions compatible with the application and the set of copy functions that are compatible with the source storage device and the destination storage device.

In one embodiment, the selection module is further configured to compare a predefined copy policy attribute to a copy function attribute for each of a group of available copy functions and to select a copy function with the largest number of attributes that satisfy the application policy attributes. In another embodiment, the selection module is further configured to calculate a difference between a predefined copy policy attribute and a copy function attribute for each of the available copy functions and to select a copy function where the differences between the copy function attributes and the predefined copy policy attributes are the smallest. In either of the two above embodiments, the modules may be configured to include a priority multiplier for each attribute and the copy function with a highest score maybe selected.

A system of the present invention is also presented for automatic copy function selection. The system may be embodied by an application module configured to send a data copy request, an identification module configured to identify available copy functions in response to a data copy request that includes a predefined copy policy, a comparison module configured to compare each copy function for the storage device to attributes of the predefined copy policy, a selection module configured to automatically select a copy function that satisfies the predefined copy policy, a relationship module configured to establish a copy relationship between the determined copy function and the data copy request, a source storage module configured to store data from the application module, and a destination storage module configured to store data copied from the source storage module in response to the data copy request using the selected copy function. The system may further include a computer network, file servers, workstations, servers, printers, data pathways, and other equipment connected to the computer network.

A method of the present invention is also presented for automatic copy function selection. The method in the disclosed embodiments substantially includes the steps necessary to carry out the functions presented above with respect to the operation of the described apparatus and system. In one embodiment, the method includes identifying available copy functions in response to a data copy request that includes a predefined copy policy, comparing each available copy function to attributes of the predefined copy policy, automatically selecting a copy function that satisfies the predefined copy policy, and establishing a copy relationship between the determined copy function and the data copy request.

The method also may include reading a set of required attributes from an application and establishing a predefined copy policy based on the set of required attributes from the application. In one embodiment, the method includes allowing a user to determine a predefined copy policy based on a set of required attributes from an application.

In a further embodiment, the method for identifying a plurality of copy functions includes determining a set of copy functions compatible with an application, determining a set of copy functions compatible with a source storage device and a destination storage device, and determining available copy functions that are common to both the set of copy functions compatible with the application and the set of copy functions that are compatible with the source storage device and the destination storage device.

In one embodiment, the method for automatically selecting a copy function further comprises comparing a predefined policy attribute to a copy function attribute for each of a group of available copy functions and selecting a copy function with the largest number of attributes that meet the application policy attributes. In another embodiment, the method of automatically selecting a copy function further comprises calculating a difference between a predefined copy policy attribute and a copy function attribute for each of the available copy functions and selecting a copy function where the differences between the copy function attributes and the predefined copy policy attributes are the smallest. In either of the above two embodiments, the methods may be configured to include a priority multiplier for each attribute and then the copy function with a highest score is selected.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors and stored on one or more computer readable media. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
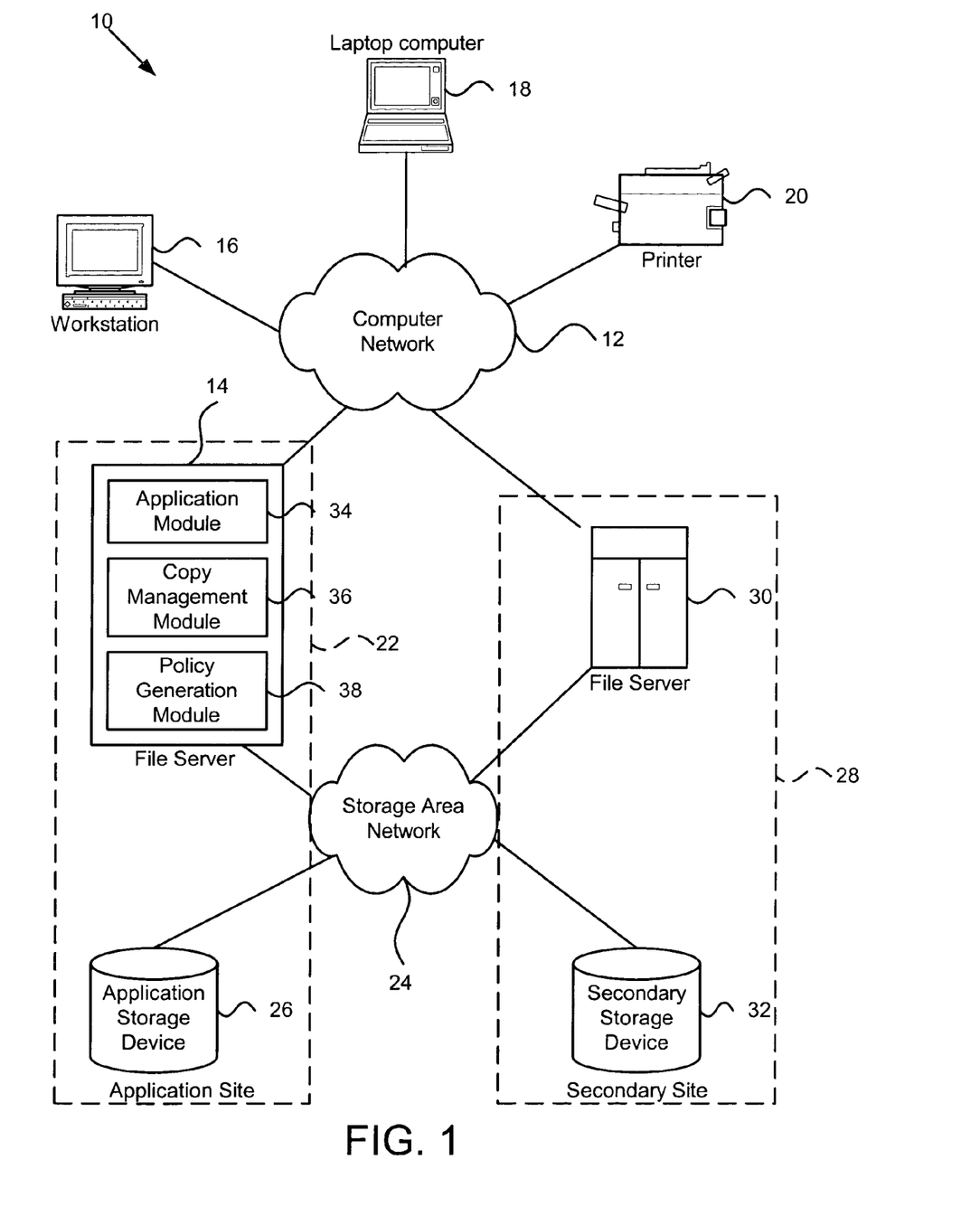
FIG. 1 is a schematic block diagram illustrating one embodiment of a system in which the automatic copy function apparatus may be implemented.

FIG. 1 depicts one embodiment of a system 10 where the present invention may be applicable. A computer network 12 connects a file server 14, a computer workstation 16, other computers such as a laptop computer 18, printers 20, and other computer components. In one embodiment, an application site 22, includes a storage area network (SAN) 24 that connects the file server 14 to an application storage device 26. The system 10 may include a secondary storage site 28 having a file server 30 connected to the computer network 12 and to the storage area network 26. The file server 30 at the secondary storage site 28 is associated with a secondary storage device 32 connected to the SAN 24.

Other embodiments may operate without a storage area network 26. File servers 14, 30 may connect directly to the storage devices 26, 32. Alternatively, the secondary storage device 28 may connect to the application storage device 26 through the computer network 12 and may not require a separate file server 30. The application storage device 26 may also connect to the computer network 12, may be integral with the file server 14, or may comprise any of the other elements of the computer system 10. Those of skill in the art will recognize various configurations for the system 10 where an application must copy data between the application storage device 26 and the secondary storage device 32.

In accordance with the present invention, the file server 14 at the application site 22 includes an application module 34 that contains an application. The file server 14 at the application site 22 also includes a copy management module 36 that automatically selects a copy function based on a copy policy. The file server 14 further includes a policy generation module 38 that generates the copy policy. In other embodiments, the copy management module 36 and the policy generation module 38 may be located in the application storage 26, the file server 30 at the secondary site 28, the secondary storage device 32, or another element of the computer system 10. The application module 34, copy management module 36, and policy generation module 38 are described in more detail in below.

Figure 2:
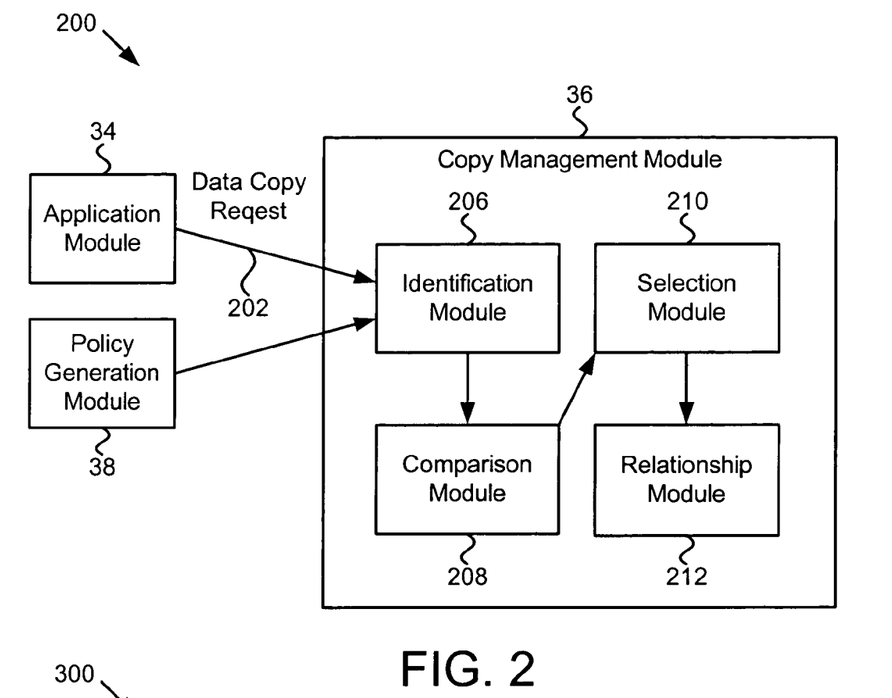
FIG. 2 is a schematic block diagram illustrating one embodiment of an automatic copy function selection apparatus in accordance with the present invention.

FIG. 2 illustrates one embodiment of an apparatus 200 for automatically selecting a copy function. The apparatus 200 may be used in conjunction with the system described above with reference to FIG. 1. An application module 34 includes an application and sends a data copy request 202 via a communication pathway to a copy management module 36. The application module 34 may execute in any device within the computer system 10. The copy management module 36 comprises an identification module 206, a comparison module 208, a selection module 210, and a relationship module 212.

The identification module 208, in one embodiment, is configured to identify available copy functions in response to a data copy request 202 that includes a predefined copy policy. Available copy functions are those copy functions that are compatible between the application module 34, the application storage device 26, and the secondary storage device 32. A typical storage device may have several copy functions that are supported by the storage device and each copy function may have different performance characteristics. For example, a disk storage device may have several copy functions that may be used with the disk storage device. One copy function may provide copying of data over long distances. Another copy function may provide copies for disaster recovery scenarios.

Each copy function may have different characteristics and may copy data in a different way. The available copy functions may be limited by compatibility restraints between the application and storage devices, by the number of copy functions configured for use by the computer system 10 configuration, or by other pertinent factors.

Three common copy functions that may be used with the present invention are FlashCopy, Peer-to-Peer Remote Copy (PPRC), and Extended Remote Copy (XRC). FlashCopy is a copy function that provides a point-in-time copy of the data for application usage such as backup and recovery operations. FlashCopy provides a copy or "view" of what the data looked like at a specific point in time.

PPRC is a hardware-based disaster recovery copy function that is designed to maintain a current copy of application data at a remote site at a great distance from the application site. PPRC can be synchronous or asynchronous.

XRC is a storage based disaster recovery and workload migration copy function that provides the capability to copy data in real time to a remote location. XRC is configured to completely recover data transactions that occur between the last safe backup and the time when an application module 34 fails.

Other copy functions such as a tape backup copy function, an optical disk copy function, a hard drive copy function, a flash memory copy function, etc. may also be automatically selected under the present invention. An example illustrating copy function attributes and copy functions is included in relation to FIG. 11.

In one embodiment, identification of available copy functions may be initiated by a data copy request 202 which may comprise an instruction from the application module 34 to copy data from the application storage device 26 to the secondary storage device 32. The data copy request 202 may also include a predefined copy policy. The copy policy is a set of copy function attribute objectives related to copy function attributes.

An example of a copy function attribute may be recovery time which, in one embodiment, is the amount of time it takes to recover data to a usable condition. A corresponding copy policy objective may be a recovery time objective which may be defined as the maximum time allowed to recover data to a usable condition. The copy policy objectives may be mandatory or desired for any given copy function attribute. The copy policy objectives are combined to form a copy policy. In another embodiment, the predefined copy policy is resident in the copy management module 36. Those of skill in the art will recognize other locations for the predefined copy policy.

The comparison module 208, in one embodiment, compares each available copy function to the predefined copy policy by comparing each copy function attribute to a corresponding copy policy objective. The selection module 210, in one embodiment, is configured to automatically select a copy function that satisfies the predefined copy policy by evaluating the comparisons made in the comparison module 208.

Various criteria exist for determining which copy function best satisfies a copy policy. In one embodiment, each copy function is scored. FIGS. 7-10 provide examples of how the comparison module 208 and the selection module 210 cooperate to compare available copy functions with the predefined copy policy, provide a score for each available copy function, and select a copy function that satisfies the predefined copy policy based on the scores.

The relationship module 212 is configured to establish a copy relationship between the determined copy function and the data copy request 202. The copy relationship is established by configuring the application module 34, the application storage device 26, and the secondary storage device 32 to use the determined copy function in copying data from the application storage device 26 to the secondary storage device 32 for the particular data copy request 202.

In another embodiment, a policy generation module 38 generates a predefined copy policy. In one embodiment, the policy generation module 38 executes on the file server at the application site 22. In another embodiment, the policy generation module 38 executes in the copy management module 36. Those of skill in the art will recognize other locations where the policy generation module 38 may execute.

The policy generation module 38, in one embodiment, reads a set of required attributes from the application module 34 and establishes a predefined copy policy based on the set of required attributes from the application module 34. In another embodiment, the policy generation module 38 allows a user to define the predefined copy policy based on a set of required attributes from an application module 34.

Figure 3:
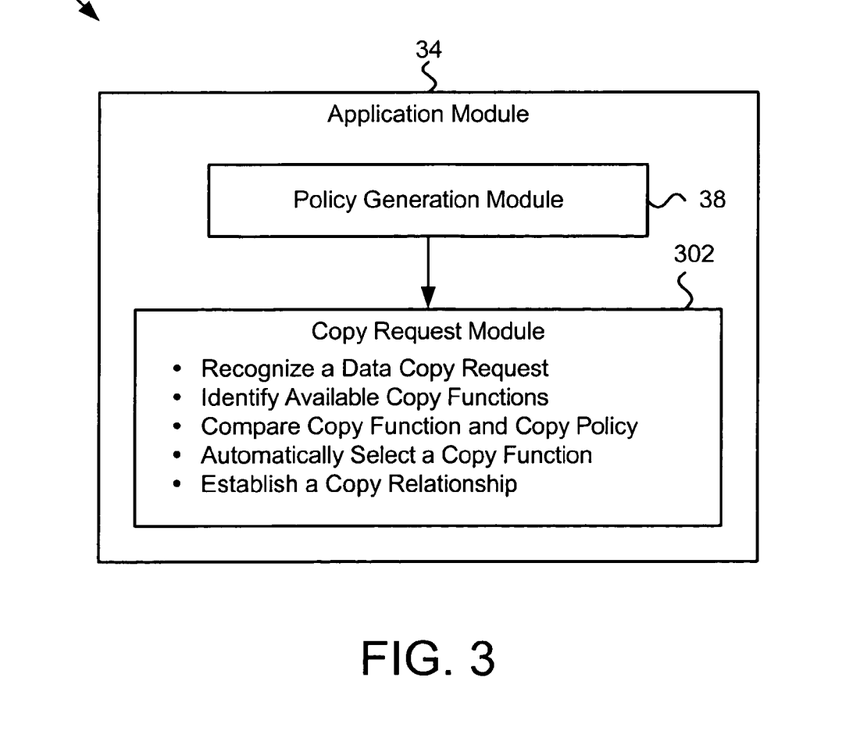
FIG. 3 is a schematic block diagram illustrating an alternative embodiment of an automatic copy function selection apparatus in accordance with the present invention.

FIG. 3 illustrates an apparatus 300 for automatic selection of a copy function c, according to an alternative embodiment. An application module 34 may be configured to include a policy generation module 38 and a copy request module 302. The policy generation module 38 is preferably configured to establish a predefined copy policy as described in relation to FIG. 2.

The data copy request may be generated by the application executing in the application module 38. The copy request module 302 then determines a set of copy functions compatible with an application, determines a set of copy functions compatible with a source storage device and a destination storage device, and determines the available copy functions that are common to both the set of copy functions compatible with the application and the set of copy functions that are compatible with the storage devices.

The copy request module 302 then compares each of the available copy functions with the copy policy generated by the policy generation module 38. The copy request module 302 then automatically selects a copy function based on the results of the comparison of the predefined copy function and the available copy functions. The copy request module 302 then establishes a copy relationship by configuring the application module 34, the application storage 26 and the secondary storage to use the selected copy function for the data copy request.

Figure 4:
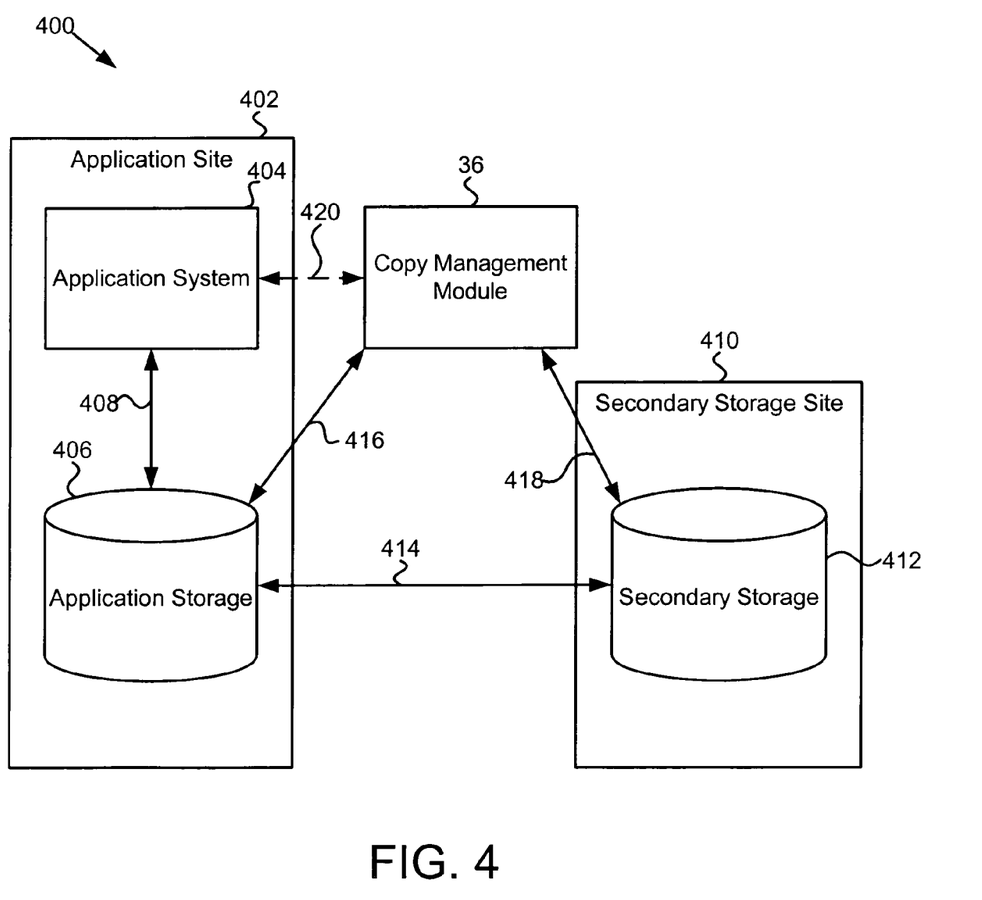
FIG. 4 is a schematic system diagram illustrating one embodiment of an automatic copy function selection system in accordance with the present invention.

FIG. 4 depicts one embodiment of a system 400 for automatically selecting a copy function. An application site 402, for example, includes an application system 404, and an application storage device 406. The application system 404 may comprise one or more software programs, other executable commands, and/or hardware components. The application system 404 may be any combination of computer software and/or hardware. The application system 404, may be connected to the application storage 406 through a fiber channel 408, copper cable, coaxial cable, communication bus, or the like.

A secondary storage site 410, in one embodiment, may comprise a stand-alone secondary storage 412 configured specifically for data storage. The secondary storage 412 may comprise hard disk storage, tape back up storage, compact disk storage, or other similar types of computer storage. The application site 402 and the secondary storage site 410 may be separated by a great distance or may be next to each other.

In one embodiment, the application storage 406 is connected to the secondary storage 412 through a connection 414 such as a fiber channel. Again, the connection 414 may comprise a copper network cable, internet connection, coaxial cable, communication bus or the like. The application storage 406 may comprise hard disk storage, tape back up storage, compact disk storage, or other similar types of computer storage.

The copy management module 36, in one embodiment, communicates with the application system 404, the application storage 406, and the secondary storage 412. In one embodiment, the copy management module 36 is connected to the application storage 406 through a Transmission Control Protocol/Internet Protocol (TCP/IP) connection 416. Similarly, the copy management module 36 is also connected to the secondary storage 412 through a TCP/IP connection 418. Alternately, the copy management module 36 may connect 420 directly to the application system 404 and may communicate with the application storage 406 via the application system 404.

Figure 5:
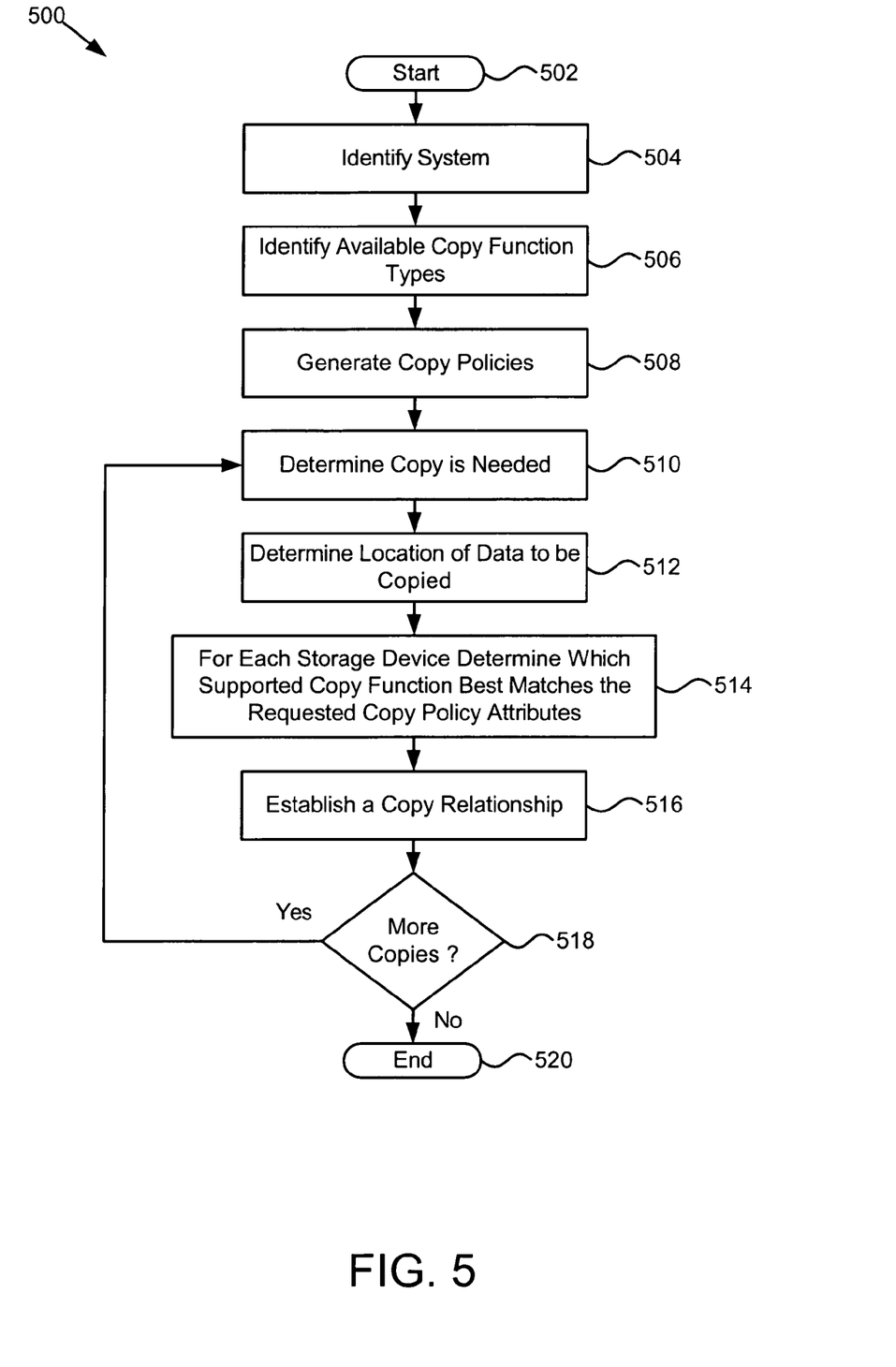
FIG. 5 is a schematic flow chart diagram illustrating one embodiment of a method for automatic copy function selection in accordance with the present invention.

FIG. 5 depicts a schematic flow chart diagram illustrating one embodiment of a method 500 for automatically selecting a copy function for use in copying data from an application or associated application storage 406 to a secondary storage 412. A copy function may take the form of any method of copying data from one location to another.

The method 500 starts 502 when the identification module 206 identifies 504 the system 10 and an associated application module 34, application storage device 26 and secondary storage device 32. The identification module 206 then identifies 506 available copy functions. The available copy functions are those copy functions that are available to the computer system 10 and are compatible with the associated application module 34, application storage device 26, and secondary storage device 32. A policy generation module 38 then generates 508 a predefined copy policy.

The predefined copy policy may be generated automatically by reading a set of attributes from the application module 34 and using the attributes to generate the predefined copy policy. Alternatively, the predefined copy policy may be generated by user input. An example of establishing a copy policy is further discussed in FIG. 11. The application module 34 then determines 510 that a copy is needed and determines 512 the location of the data and secondary storage device where data is to be copied.

The copy management module 36 then determines 514 which of the available copy functions best matches the predefined copy policy. Examples of four methods to determine which available copy function best matches the predefined copy policy are described in FIGS. 7, 8, 9, and 10. Other methods may be chosen by those skilled in the art for a given situation. The copy management module 36 then establishes 516 a copy relationship by configuring the application module 34, application storage device 26, and secondary storage device 34 to use the selected copy function to copy data. If more copies of data are required 518, the method 500 returns and determines 510 that a copy is needed. If no more copies of data are required 518, the method 500 ends 520.

Figure 6:
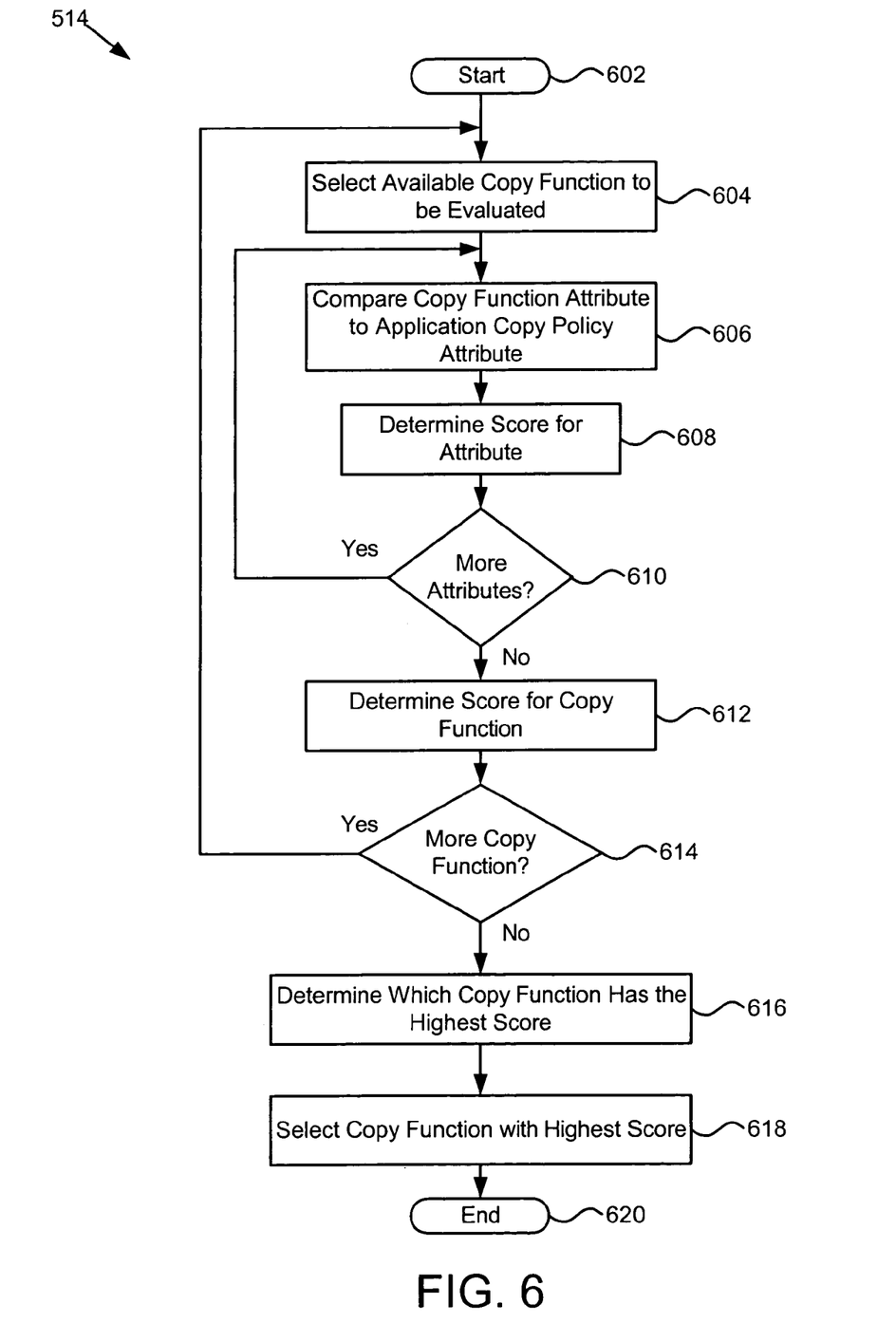
FIG. 6 is a schematic flow chart diagram illustrating an alternative method for selecting a copy function in accordance with the present invention.

FIG. 6 is a more detailed schematic flow chart that illustrates one embodiment of a manner in which how a copy policy maybe matched 514 with a copy function. The method 600 starts 602 by selecting 604 a candidate copy function from the available copy functions. Once a copy function has been selected, an attribute of the copy function is compared 606 to a corresponding copy policy attribute. The comparison module 208 then determines 608 a score for the attribute. Next, a determination is made 610 whether there are more copy function attributes to be evaluated. If so, the method 600 returns and compares 606 a next copy function attribute to a next copy policy attribute. If there are no more attributes to be evaluated for a particular copy function, the comparison module 208 determines 612 a score for the copy function.

The method 600 then determines 614 if there are more copy functions to be evaluated. If so, the method returns and selects 604 the next copy function to be evaluated. If not, the selection module 210 determines 616 which of the copy functions evaluated has a highest score. The selection module 210 then selects 618 the copy function with the highest score and the method is ended 620.

Figure 7:
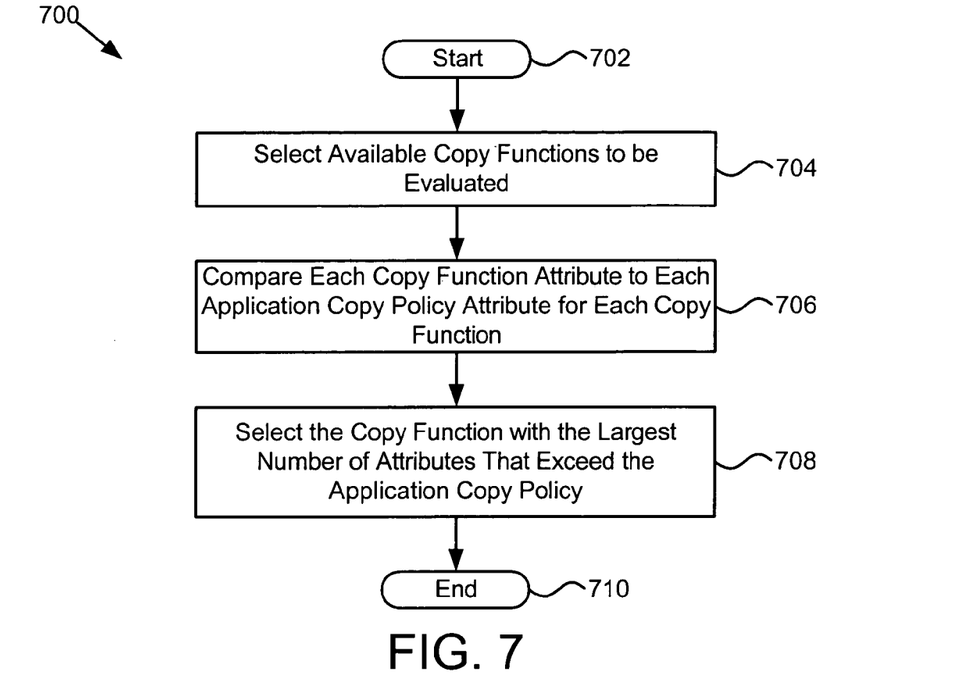
FIG. 7 is a schematic flow chart diagram illustrating a method for comparing an application copy policy to copy functions in accordance with the present invention.

FIG. 7 is one embodiment of a generalized schematic flow chart for determining which of the evaluated copy functions best satisfies the predefined copy policy determining which of the evaluated copy functions has a highest score. The method 700 starts 702 and an identification module 206 selects 704 available copy functions to be evaluated. For each copy function, a comparison module 208 then compares 706 each copy function attribute to each application copy policy attribute. After each attribute is evaluated for each copy function and the number of copy function attributes that meet or exceed the corresponding copy policy attribute is tallied for each copy function, the selection module 210 then selects 708 the copy function with the largest number of attributes that meet or exceed the performance of application policy attributes and then ends 710.

Figure 8:
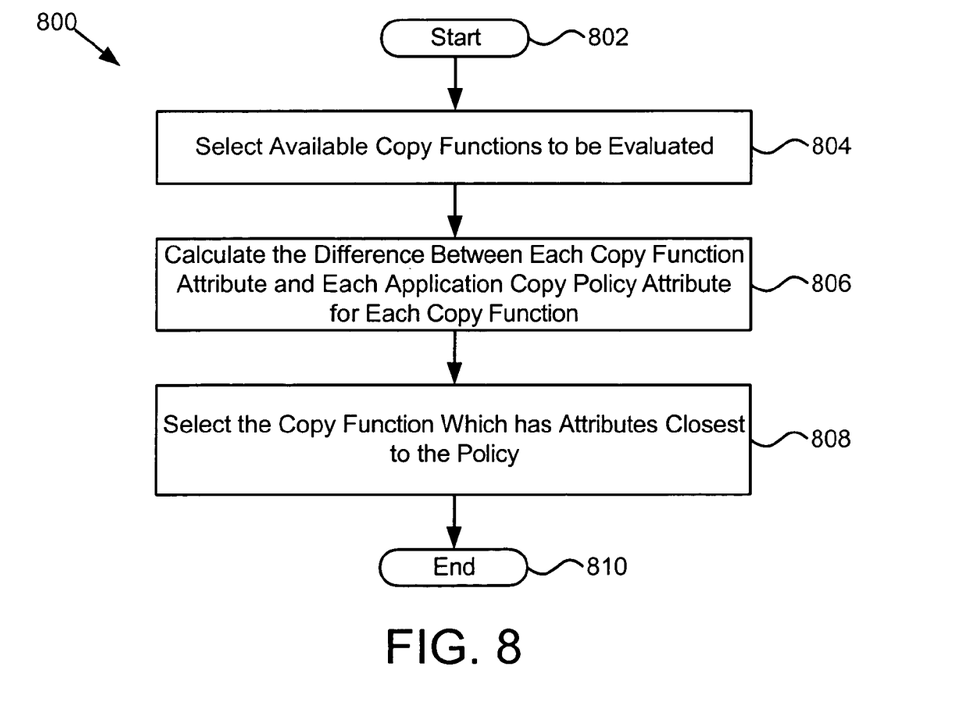
FIG. 8 is a schematic flow chart diagram illustrating another method for comparing an application copy policy to copy functions in accordance with the present invention.

FIG. 8 is another embodiment of a generalized schematic flow chart for determining which of the evaluated copy functions best satisfies the predefined copy policy by determining which of the evaluated copy functions is closest to the application copy policy. The method 800 starts 802 and an identification module 206 selects 804 available copy functions to be evaluated. For each copy function, the comparison module 208 then calculates 806 a difference between the scores for each copy function attribute and the scores for each application copy policy attribute. To calculate the difference, each attribute is formulated so each copy policy attribute is assigned a value such that a difference from a corresponding copy function attribute can be calculated. In one embodiment, each attribute may be formulated to determine a difference between a copy policy attribute and each corresponding copy function attribute and then scaled so each attribute is on the same scale as the other attributes of the copy policy. For example, each attribute could be scaled so an ideal difference is zero and a worst case difference is one. In one embodiment, a copy policy attribute value is 3 with a conceivable worst case value of 10. Suppose, copy function attributes of three copy functions are 3, 4, and 5. Taking a difference for each copy function attribute would yield differences of 0, 1, and 2, respectively. Scaling the numbers with a worst case of 10 and a basis of 1, the differences become 0, $\frac{1}{7}$ or 0.143, and $\frac{2}{7}$ or 0.286. The first copy function attribute with a difference of zero is more desirable than the other copy function attributes.

Boolean attributes may be formulated such that a positive result may yield a value and a negative result may yield a zero. In one embodiment, for the copy policy attribute of Consistency, the copy policy attribute may require a "yes" response and this may be assigned a value of 1. If a corresponding copy function attribute can provide data consistency, then a Consistency attribute value of 1 is assigned and the difference is between the copy function attribute and the copy policy attribute is zero. If a corresponding Consistency copy function attribute is "no", then the attribute is assigned a value of zero and the difference is 1. The copy function attribute difference of zero is more desirable than the copy function attribute difference of 1.

Inequalities may be calculated by either calculating a difference from an ideal copy policy attribute or, alternatively, may be formulated to yield a specific value if the inequality is exceeded and to yield a lesser value if the inequality is not exceeded. For example, for the copy policy attribute of Application Impact, if the copy policy attribute is less than 2 milliseconds, one formulation would be to assign a value of zero to the copy policy attribute, since this is the ideal, and then to measure each corresponding copy function attribute against the copy policy attribute value of zero. Each difference would then be scaled to be between zero and 1. In another formulation, any copy function Application Impact less than 2 milliseconds would be assigned a value of zero and any copy function application impact of more than 2 milliseconds would be calculated by subtracting 2 milliseconds and then scaling the result to be between zero and 1. Those of skill in the art will recognize other formulations to yield a difference between copy policy attributes and copy function attributes based on copy function attribute characteristics and desired goals.

The selection module 210 then selects 808 the copy function that best satisfies the predefined copy policy by determining which copy function has a sum of differences among attribute scores that is the lowest. This method 800 determines which copy function is closest to the predefined copy policy for each copy function attribute rather than simply determining if the copy policy attribute has been exceeded as in FIG. 7.

Figure 9:
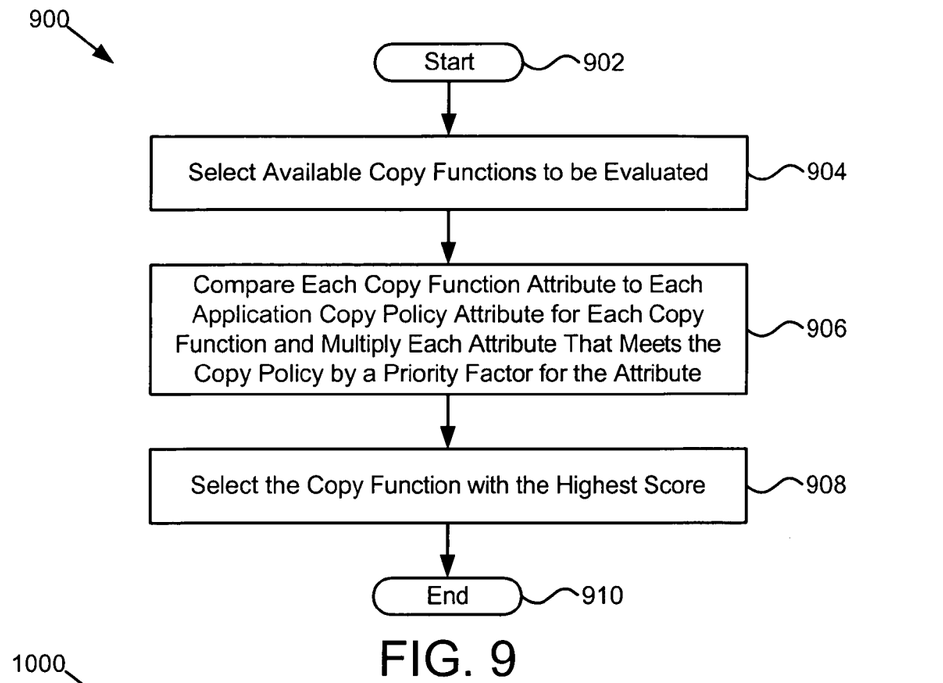
FIG. 9 is a schematic flow chart diagram illustrating an alternative method for comparing an application copy policy to copy functions in accordance with the present invention.

FIG. 9 is a variation of the method 700 described in FIG. 7. The method 900 starts 902 and an identification module 206 selects 904 available copy functions to be evaluated. The comparison module 208 then compares 906 each copy function attribute to each corresponding copy policy attribute for each of the available copy functions and then multiplies the score for each attribute that meets a copy policy attribute by a priority factor for the attribute. The priority factor can be any weighting that allows a relative importance of each copy function attribute to be assigned. The selection module 210 then selects 908 the copy function with a highest score and ends 910. This method 900 allows a weighted priority to be assigned to each copy policy attribute.

Figure 10:
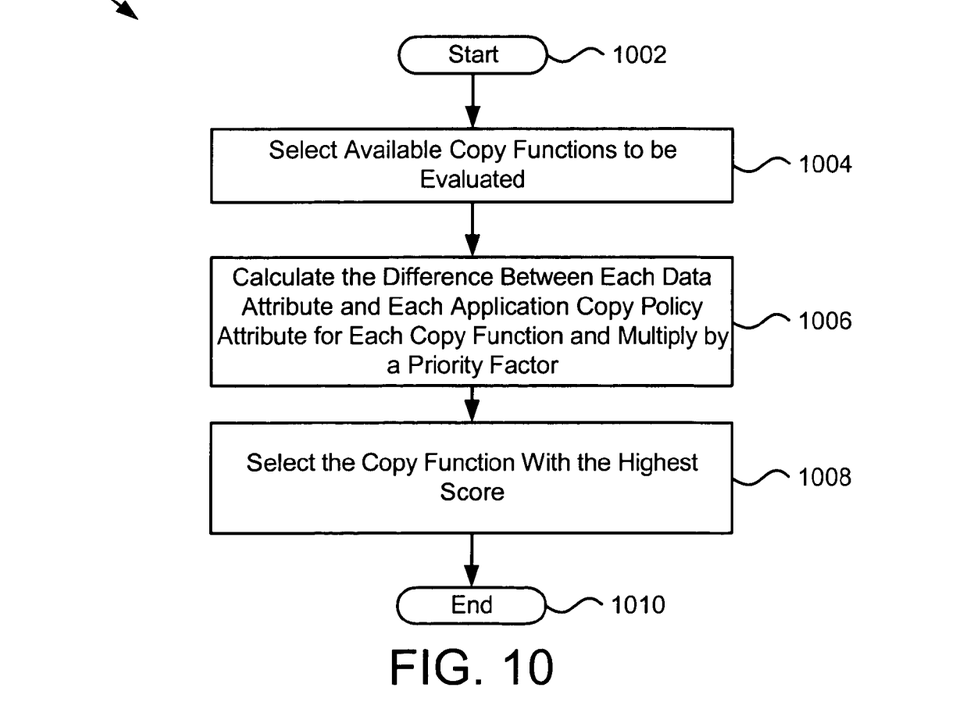
FIG. 10 is a schematic flow chart diagram illustrating an alternative method for comparing an application copy policy to copy functions in accordance with the present invention.

FIG. 10 is a variation of the method 800 described in relation to FIG. 8. The method 1000 starts 1002 and an identification module 206 selects 1004 available copy functions to be evaluated. The comparison module 208 then calculates

1006 the difference between each copy function attribute and each predefined copy policy attribute for each copy function and multiplies the difference by a priority factor to calculate a score. Again, the priority factor can be any weighting that allows a relative importance of each copy function attribute to be assigned. The selection module 210 then selects 1008 the copy function with a highest score and ends 1010. This method 1000 allows a weighted priority to be assigned to each copy policy attribute in combination with calculation of the difference between each copy policy attribute and each copy function attribute.

The examples of methods for selection of a copy function described in relation to FIGS. 7-10 are a few of various possible methods of copy function selection. Those of skill in the art will recognize other methods within the scope of the present invention.

Figure 11:
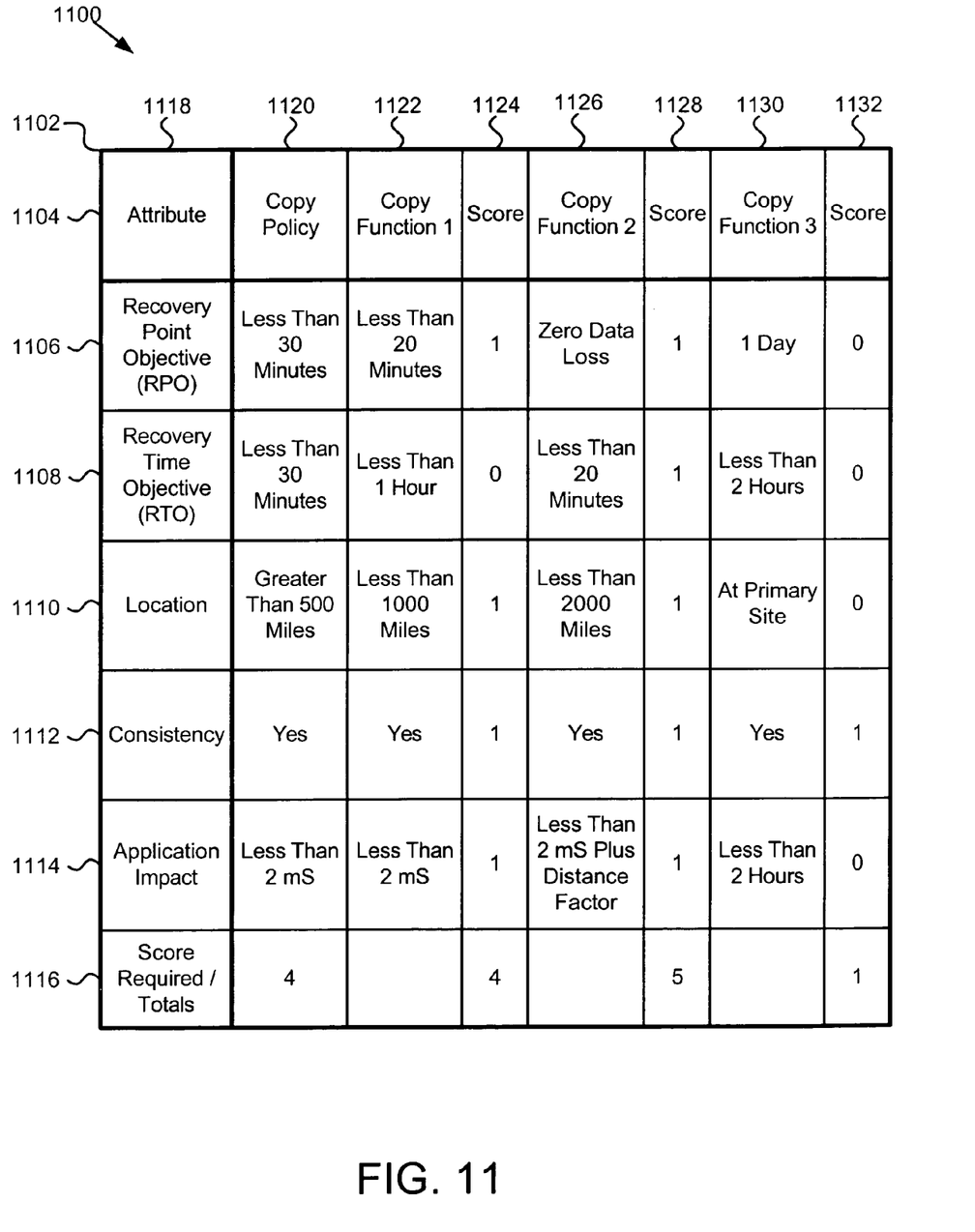
FIG. 11 is an example of a copy function selection scenario in accordance with the present invention.

FIG. 11 is a table 1100 illustrating one embodiment of a manner of selecting a copy function using the method 700 shown in FIG. 7. The example is summarized in a table 1102. Suppose the following business attributes 1104 exist for disaster recovery application: RPO, RTO, Location, Consistency, and Application Impact. These attributes 1104 are examples of a few possible attributes 1104 for a copy policy.

Recovery Point Objective (RPO) 1106 is the point to which data is recovered. Typically, the RPO defines the amount of data lost over a period of time due to a disaster. The range for this attribute runs from zero data loss to several days of data loss. Recovery Time Objective (RTO) 1108 is the amount of time it takes to recover data to a usable condition. Roughly speaking this defines the duration of an outage. The range is from instantaneous through days. Location 1110 defines the place where data is copied to. Consistency 1112—Typically in a distributed business environment, certain data is dependent on other data, and cannot be recovered without correctness of the data upon which it depends. One example is a transaction that updates several related databases in sequence. If an update in the sequence is present during recovery but earlier updates are not present, then the related data does not agree. Application Impact 1114—Many copy functions introduce a performance impact to the application, usually by increasing the application response time typically in milliseconds (mS). Some operations cause a long-term stoppage of I/O for an application. This business attribute is a measurement of the amount of impact the application can tolerate.

The score desired for a copy policy and totals for copy functions are in the last line 1116. The business attributes 1106, 1108, 1110, 1112, 1114 are combined into a copy policy 1120. The copy policy 1120 represents the business requirements for the data. The copy policy 1120 comprises a desired goal to be met by applying the most appropriate available copy function when making a copy. Each value in the table 1102 is specified as an inequality, such as "RPO less than 20 minutes", or a specific value (Consistency=YES). The desired score and totals 1116 may represent maximum or minimum values, as in the example copy policy 1120 of FIG. 11, the total represents a count of attributes 1104 that matched between the copy policy 1120 and an available copy function. If the desired score and totals 116 represent maximum values, the inequalities and criteria for the business attributes 1106, 1108, 1110, 1112, 1114 may be opposite or re-phrased from those illustrated in FIG. 11. In addition, the business attributes 1106, 1108, 1110, 1112, 1114 may be organized and defined to provide copy policies 1120 and attributes for satisfying the copy policies 1120 in accordance with the methods 800, 900, or 1000 shown in FIGS. 8, 9, and 10, as well as other copy policies readily recognized by those with skill in the art.

In a representative example, a copy policy 1120 might be: RPO less than 30 minutes, RTO less than 30 minutes, Location: Greater than 500 miles, consistency: Yes, Application Impact less than 2 milliseconds (mS), and the required minimum score is 4, meaning any copy function not having a minimum score of 4 is unacceptable. In one embodiment, scores are Boolean values 1 or 0 and awarded based on whether the copy function attribute 1124 satisfies a copy policy 1120 attribute. In this example, any copy function with an RPO attribute less than 30 minutes would receive a score of 1 for that attribute, any copy function with an RTO attribute less than 30 minutes would receive a score of 1 for that attribute, etc.

Suppose a copy function 1 has attributes as shown in column 1122. Scores for each attribute of copy function 1 are in the adjacent column 1124 with an overall score for copy function 1 at the bottom of the column 1124. The next column 1126 includes attributes of copy function. The score for copy function 2 is in column 1128. The final two columns 1130, 1132 show attributes of copy function 3, which may be similar to a tape backup copy function, and the score for copy function 3 in the last column.

In this example, copy functions 1 and 2 are acceptable options to be selected since they both received scores greater than or equal to the minimum score for the copy policy 1120, which is a score of 4. Comparing copy functions 1 and 2, copy function 2 received the higher score of 5 so it could be selected and implemented as the chosen copy function that best satisfies the copy policy 1120.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for automatically selecting a copy function, the apparatus comprising:

an identification module configured to identify one or more available copy functions in response to a data copy request to copy data to a secondary storage device, the identification module identifying each identified copy function by determining that the copy function is available to an application to copy data of the data copy request to the secondary storage device, the secondary storage device comprising one of one or more secondary storage devices available to the application for storing the data;

a comparison module configured to compare copy function attributes of each identified copy function to corresponding copy policy objectives of a predefined copy policy, wherein the copy policy comprises a set of copy policy objectives that correspond to the copy function attributes of each copy function, the copy policy objectives comprising at least two of a recovery point objective, a recovery time objective, a location, a consistency, and an application impact;

a selection module configured to automatically select a copy function that satisfies the predefined copy policy based on the comparison of the copy function attributes to the corresponding objectives of the copy policy; and a relationship module configured to establish a copy relationship between the selected copy function and the data copy request, the copy relationship configured to use the selected copy function to copy the requested data to a secondary storage device, wherein the identification module, the comparison module, the selection module, and the relationship module comprise at least one of hardware and executable code, the executable code executable on a processor and stored on one or more computer readable media;

wherein the comparison module is further configured to calculate a difference between at least two of the copy function attributes, each configured as a numerical value, and corresponding predefined copy policy objectives for each of the available copy functions, to multiply each difference by a priority factor to obtain an adjusted difference, to sum the adjusted differences for each copy function, and the selection module is further configured to select a copy function with a lowest sum of adjusted differences.

2. The apparatus of claim 1, further comprising a policy generation module configured to read a set of required objectives from the application and to establish the predefined copy policy based on the set of required objectives from the application.

3. The apparatus of claim 1, further comprising a policy generation module configured to allow a user to determine the predefined copy policy based on a set of required objectives from an application.

4. The apparatus of claim 1, wherein the identification module is further configured to determine a set of copy functions compatible with the application, determine a set of copy functions compatible with a source storage device, where the data of the data request is stored, and the secondary storage device, and to determine available copy functions that are common to both the set of copy functions compatible with the application and the set of copy functions that are compatible with the source storage device and the secondary storage device.

5. The apparatus of claim 1, wherein the comparison module is further configured to compare one or more copy function attributes of a copy function to corresponding predefined copy policy objectives, of the predefined copy policy, for each of a group of available copy functions and the selection module is further configured to select a copy function with a largest number of copy function attributes that satisfy the predefined copy policy objectives.

6. The apparatus of claim 1, wherein the comparison module is further configured to calculate a difference between one or more copy function attributes, each configured as a numerical value, and corresponding predefined copy policy objectives, each configured as a numerical value, for each of a group of available copy functions and the selection module is further configured to select a copy function where the total difference between the numerical values of the copy function attributes and the numerical values of the predefined copy policy objectives is the smallest.

7. The apparatus of claim 1, wherein the comparison module is further configured to compare one or more copy function attributes to corresponding predefined copy policy objectives for each of the available copy functions to determine a score for each attribute of each copy function, to multiply each score by a priority factor to determine an adjusted score, to sum the adjusted scores for each copy function, and the selection module is further configured to select a copy function with a highest sum of adjusted scores.

8. An apparatus for automatically selecting a copy function, the apparatus comprising:

a policy generation module configured to establish a copy policy compatible with an application, the copy policy comprising copy policy objectives, the copy policy objectives comprising at least two of a recovery point objective, a recovery time objective, a location, a consistency, and an application impact; and a copy request module configured to:
recognize a data copy request that included the copy policy;

identify one or more available copy functions in response to a data copy request to copy data to a secondary storage device by determining that each copy function is available to the application to copy data to a secondary storage device of the one or more secondary storage devices, the one or more secondary storage devices available to the application for storing data;

compare copy function attributes of each copy function for a storage device to copy policy objectives of the copy policy, wherein the copy policy comprises a set of copy policy objectives that correspond to the copy function attributes of each copy function;

automatically select a copy function that satisfies the copy policy based on the comparison of the copy function attributes to the corresponding objectives of the copy policy; and establish a copy relationship between the selected copy function and the data copy request, the copy relationship configured to use the selected copy function to copy the requested data to a secondary storage devices;

wherein the policy generation module and the copy request module comprise at least one of hardware and executable code, the executable code executable on a processor and stored on one or more computer readable media;

wherein comparing attributes of each copy function for a storage device to objectives of the copy policy further comprises calculating a difference between at least two of the copy function attributes, each configured as a numerical value, and corresponding copy policy objectives, each configured as a numerical value, for each of the available copy functions, multiplying each difference by a priority factor to obtain an adjusted difference, summing the adjusted differences for each copy function, and automatically selecting a copy function further comprises selecting a copy function with a lowest sum of adjusted differences.

9. The apparatus of claim 8, wherein the policy generation module is configured to read a set of required objectives from the application and to establish a copy policy based on the set of required objectives from the application.

10. The apparatus of claim 8, wherein the policy generation module is configured to allow a user to determine a predefined copy policy based on a set of required objectives from the application.

11. The apparatus of claim 8, wherein identifying available copy functions further comprises determining a set of copy functions compatible with the application, determining a set of copy functions compatible with a source storage device and the secondary storage device, and determining available copy functions that are common to both the set of copy functions compatible with the application and the set of copy functions that are compatible with the source storage device and the secondary storage device.

12. The apparatus of claim 8, wherein comparing attributes of each copy function for a storage device to objectives of the copy policy further comprises comparing one or more copy function attributes to corresponding copy policy objectives, of the predefined copy policy, for each of a group of available copy functions and automatically selecting a copy function further comprises selecting a copy function with a largest number of copy function attributes that satisfy the predefined copy policy objectives.

13. The apparatus of claim 8, wherein comparing attributes of each copy function for a storage device to objectives of the copy policy further comprises calculating a difference between one or more copy function attributes, each configured as a numerical value, and corresponding predefined copy policy objectives, each configured as a numerical value, for each of the available copy functions and automatically selecting a copy function further comprises selecting a copy function where differences between the copy function attributes and the predefined copy policy objectives are the smallest.

14. The apparatus of claim 8, wherein comparing attributes of each copy function for a storage device to objectives of the copy policy further comprises comparing one or more copy function attributes, each configured as a numerical value, to corresponding predefined copy policy objectives, each configured as a numerical value, for each of the available copy functions, determining a score for each attribute of each copy function, multiplying each score by a priority factor to determine an adjusted score, summing the adjusted scores for each copy function, and automatically selecting a copy function further comprises selecting a copy function with a highest sum of adjusted scores.

15. A system for automatically selecting a copy function, the system comprising:
  a file server comprising
    an application module configured to send a data copy request from an application;
    an identification module configured to identify one or more available copy functions in response to a data copy request to copy data to a secondary storage device, the identification module identifying each copy function by determining that the copy function is available to the application to copy data of the data copy request to the secondary storage device, the secondary storage device comprising one of one or more secondary storage devices available to the application for storing the data;
    a comparison module configured to compare copy function attributes of each available copy function to corresponding copy policy objectives of a predefined copy policy, wherein the copy policy comprises a set of copy policy objectives that correspond to the copy function attributes of each copy function, the copy policy objectives comprising at least two of a recovery point objective, a recovery time objective, a location, a consistency, and an application impact;
    a selection module configured to automatically select a copy function that satisfies the predefined copy policy based on the comparison of the copy function attributes to the corresponding objectives of the copy policy;
    a relationship module configured to establish a copy relationship between the selected copy function and the data copy request, the copy relationship configured to use the selected copy function to copy the requested data to a secondary storage device;
  wherein the comparison module is further configured to calculate a difference between at least two of the copy function attributes, each configured as a numerical value, and corresponding predefined copy policy objectives for each of the available copy functions, to multiply each difference by a priority factor to obtain an adjusted difference, to sum the adjusted differences for each copy function, and the selection module is further configured to select a copy function with a lowest sum of adjusted differences.

16. The system of claim 15, further comprising a policy generation module configured to read a set of required objectives from the application and to establish a predefined copy policy based on the set of required objectives from the application.

17. The system of claim 15, further comprising a policy generation module configured to allow a user to determine a predefined copy policy based on a set of required objectives from an application.

18. The system of claim 15, wherein the identification module is further configured to determine a set of copy functions compatible with the application, determine a set of copy functions compatible with a source storage device, where the data of the data request is stored, and the secondary storage device, and to determine available copy functions that are common to both the set of copy functions compatible with the application and the set of copy functions that are compatible with the source storage device and the secondary storage device.

19. The system of claim 15, wherein the comparison module is further configured to compare one or more copy function attributes to corresponding predefined copy policy objectives, of the predefined copy policy, for each of a group of available copy functions and the selection module is further configured to select a copy function with a largest number of copy function attributes that satisfy the predefined copy policy objectives.

20. The system of claim 15, the comparison module is further configured to calculate a difference between one or more copy function attributes, each configured as a numerical value, and corresponding predefined copy policy objectives, each configured as a numerical value, for each of a group of available copy functions and the selection module is further configured to select a copy function where differences between the copy function attributes and the predefined copy policy objectives are the smallest.

21. The system of claim 15, wherein the comparison module is further configured to compare one or more copy function attributes to corresponding predefined copy function objectives for each of the available copy functions to determine a score for each attribute of each copy function, to multiply each score by a priority factor to determine an adjusted score, to sum the adjusted scores for each copy function, and the selection module is further configured to select a copy function with a highest sum of adjusted scores.

22. A method for automatically selecting a copy function, the method comprising:
  identifying one or more available copy functions in response to a data copy request that includes a predefined copy policy, the data copy request to copy data to a secondary storage device, the identifying comprising identifying each copy function by determining that the copy function is available to an application to copy data of the data copy request to the secondary storage device, the secondary storage device comprising one of one or more secondary storage devices available to the application for storing the data;
  comparing copy function attributes of each available copy function to corresponding copy policy objectives of a predefined copy policy, wherein the copy policy comprises a set of copy policy objectives that correspond to the copy function attributes of each copy function, the copy policy objectives comprising at least two of a recovery point objective, a recovery time objective, a location, a consistency, and an application impact;

automatically selecting a copy function that satisfies the predefined copy policy based on the comparison of the copy function attributes to the corresponding objectives of the copy policy; and establishing a copy relationship between the selected copy function and the data copy request, the copy relationship configured to use the selected copy function to copy the requested data to a secondary storage devices;

wherein comparing attributes of each available copy function to corresponding objectives of the predefined copy policy further comprises calculating a difference between at least two copy function attributes, each configured as a numerical value, and corresponding predefined copy policy objectives, each configured as a numerical value, for each of the available copy functions, multiplying each difference by a priority factor to obtain an adjusted difference, summing the adjusted differences for each copy function, and automatically selecting a copy function that satisfies the predefined copy policy further comprises selecting a copy function with a lowest sum of adjusted differences.

23. The method of claim 22, further comprising reading a set of required objectives from the application and establishing a predefined copy policy based on the set of required objectives from the application.

24. The method of claim 22, further comprising allowing a user to determine a predefined copy policy based on a set of required objectives from an application.

25. The method of claim 22, identifying available copy functions further comprises determining a set of copy functions compatible with the application, determining a set of copy functions compatible with a source storage device, where the data of the data request is stored, and the secondary storage device, and determining available copy functions that are common to both the set of copy functions compatible with the application and the set of copy functions that are compatible with the source storage device and the secondary storage device.

26. The method of claim 22, wherein comparing one or more attributes of each available copy function corresponding objectives of the predefined copy policy further comprises comparing one or more copy function attributes to corresponding predefined copy policy objectives, of the predefined copy policy, for each of a group of available copy functions and automatically selecting a copy function that satisfies the predefined copy policy further comprises selecting a copy function with a largest number of copy function attributes that meet the predefined copy policy objectives.

27. The method of claim 22, wherein comparing one or more attributes of each available copy function corresponding objectives of the predefined copy policy further comprises calculating a difference between one or more copy function attributes, each configured as a numerical value, and corresponding predefined copy policy objectives, each configured as a numerical value, for each of the available copy functions and automatically selecting a copy function that satisfies the predefined copy policy further comprises selecting a copy function where differences between the copy function attributes and the predefined copy policy objectives are the smallest.

28. The method of claim 22, wherein comparing one or more attributes of each available copy function corresponding objectives of the predefined copy policy further comprises comparing one or more copy function attributes to corresponding predefined copy policy objectives for each of the available copy functions, determining a score for each attribute of each copy function, multiplying each score by a priority factor to determine an adjusted score, summing the adjusted scores for each copy function, and automatically selecting a copy function that satisfies the predefined copy policy further comprises selecting a copy function with a highest sum of adjusted scores.

29. A computer readable storage medium comprising computer readable code configured to carry out a method for automatically selecting a copy function, the method comprising:

identifying one or more available copy functions in response to a data copy request to copy the data that includes a predefined copy policy, the data copy request to copy the data to a secondary storage device, the identifying comprising identifying each copy function by determining that the copy function is compatible with the secondary storage device and available to an application to copy the data to the secondary storage device, the secondary storage device comprising one of one or more secondary storage devices available to the application for storing the data;

comparing copy function attributes of each available copy function to corresponding copy policy objectives of the predefined copy policy, wherein the copy policy comprises a set of copy policy objectives that correspond to the copy function attributes of each copy function, wherein the predefined copy policy objectives within the predefined copy policy comprise a recovery point objective ("RPO"), a recovery time objective ("RTO"), a distance to a secondary site where the secondary storage device is stored, a consistency, and an application impact, wherein an RPO comprises an amount of data lost over a period of time, wherein an RTO comprises an amount of time to recover data to a usable condition, wherein a consistency comprises a determination of dependency on other stored data, wherein an application impact comprises a performance impact caused by a copy function to the application, the performance impact measured in a unit of time;

automatically selecting a copy function that satisfies the predefined copy policy based on the comparison of the copy function attributes to the corresponding objectives of the copy policy; and establishing a copy relationship between the selected copy function and the data copy request, the copy relationship configured to use the selected copy function to copy the requested data to a secondary storage devices;

wherein comparing attributes of each available copy function to corresponding objectives of the predefined copy policy further comprises calculating a difference between at least two of the copy function attributes, each configured as a numerical value, and corresponding predefined copy policy objectives, each configured as a numerical value, for each of the available copy functions, multiplying each difference by a priority factor to obtain an adjusted difference, summing the adjusted differences for each copy function, and automatically selecting a copy function that satisfies the predefined copy policy further comprises selecting a copy function with a lowest sum of adjusted differences.

30. The computer readable storage medium of claim 29, wherein identifying available copy functions further comprises determining a set of copy functions compatible with the application, determining a set of copy functions compatible with a source storage device, where the data of the data request is stored, and the secondary storage device, and determining available copy functions that are common to both the set of copy functions compatible with the application and the set of copy functions that are compatible with the source storage device and the secondary storage device.

* * * * *